United States Patent [19]
Katz et al.

[11] Patent Number: 4,834,394
[45] Date of Patent: May 30, 1989

[54] SEALED UNIVERSAL MOVEMENT OF A SHAFT EXTENDING BETWEEN ENVIRONMENTS

[75] Inventors: George Katz, Ossining; Theodore Nalesnik, Yonkers, both of N.Y.

[73] Assignee: North American Philip Corporation, New York, N.Y.

[21] Appl. No.: 216,552

[22] Filed: Jul. 7, 1988

Related U.S. Application Data

[63] Continuation-in-part of Ser. No. 207,907, Jun. 16, 1988, which is a continuation of Ser. No. 46,599, May 7, 1987, abandoned.

[51] Int. Cl.⁴ .............................................. F16J 15/16
[52] U.S. Cl. ........................................ 277/12; 277/3; 277/DIG. 7; 73/864.83; 414/292
[58] Field of Search ............ 277/3, 12, 27, 32, 237 R, 277/DIG. 7; 73/864.83; 250/289; 414/292

[56] References Cited

U.S. PATENT DOCUMENTS

| | | | |
|---|---|---|---|
| 2,553,938 | 5/1951 | Peirce | 277/DIG. 7 X |
| 3,410,672 | 11/1968 | De Lajarte | 277/DIG. 7 X |
| 3,643,511 | 2/1972 | Warncke et al. | 73/864.83 X |
| 3,888,300 | 6/1975 | Guichard et al. | 277/DIG. 7 X |
| 3,910,428 | 10/1975 | Peterson | 414/292 |
| 3,984,719 | 10/1976 | Grasis et al. | 313/217 |
| 4,067,697 | 1/1978 | Polaschegg | 422/68 |
| 4,140,228 | 2/1979 | Hathaway et al. | 414/292 X |
| 4,174,842 | 11/1979 | Partus | 277/3 |

FOREIGN PATENT DOCUMENTS 170175 1/1952 Austria .
172795 10/1952 Austria .

*Primary Examiner*—Robert S. Ward
*Attorney, Agent, or Firm*—F. Brice Faller

[57] ABSTRACT

Apparatus includes a mounting member having a bore which closely receives the shaft and a counterbore in which two elastic O-rings separated by an annular element are received. A first compression member threadably engages the mounting member to apply axial pressure to the O-rings, which are radially compressed against the shaft by bevelled annular surfaces which capture the O-rings. This provides an environmental seal effective for a vacuum while still permitting axial and rotational movement of the shaft. Apparatus further includes a ball member fixed to the mounting member and received against an O-ring in a socket member. A second compression member threadably engaging the socket member to urge the ball member against the seal to provide additional sealing while permitting pivotal movement of the shaft.

17 Claims, 1 Drawing Sheet

SEALED UNIVERSAL MOVEMENT OF A SHAFT EXTENDING BETWEEN ENVIRONMENTS

BACKGROUND OF THE INVENTION

This application is a continuation-in-part of U.S. Application Ser. No. 07/207,907, pending, which is a continuation of Ser. No. 07/046,599, abandoned, the disclosure of which is incorporated herein by reference.

The invention relates to an apparatus for receiving a shaft extending between first and second environments and sealing the environment from each other. More particularly, it relates to such an apparatus permitting universal movement of the shaft.

In an electron microscope it is necessary to have a high vacuum between the object being examined and the scanning device. The object is placed on a stage in a chamber which is subsequently evacuated to permit electron scanning. The stage is associated with a mechanism which provides feedback on its location so that the scanning device can be properly focussed.

Since an electron microscope magnifies up to 200,000 times, it is sometimes difficult to determine how the object being scanned appears when conventionally magnified. It is thus desired to provide auxiliary magnification means in the evacuated chamber. To this end, a vacuum tight borescope which can be inserted into the chamber has been developed. The borescope is a device comprising a cylindrical shaft having a window at one end and internal reflecting and magnification means. A shaft inserted in the chamber with the window proximate to the object being scanned can thus transmit an image at 1000x magnification to the opposite end of the shaft, outside the chamber. The associated problem is the provision of an effective vacuum seal which still permits universal movement of the shaft.

SUMMARY OF THE INVENTION

The present invention provides a sealing arrangement which permits axial and rotational or twisting movement of a shaft extending between two environments. The apparatus incorporating the sealing arrangement is especially effective between a first environment at ambient pressure and a second environment at high vacuum. In the preferred embodiment, the apparatus further includes a sealing arrangement which permits pivotal movement of the shaft.

The inventive apparatus includes a mounting member having a bore and a contiguous bevelled first annular surface facing the first environment which provides a seat for a first elastic O-ring. A washer-like first annular element having opposed bevelled second and third annular surfaces is located between the first O-ring and a second O-ring. A compression member having a coaxial bore and a fourth annular surface facing the second O-ring threadably engages the mounting member to axially compress the O-rings after the shaft of the borescope is received through the bores. The bevelled surfaces cause the O-rings to be radially compressed to engage the shaft and seal the first or ambient environment from the vacuum chamber. With this sealing arrangement it is possible to move the shaft both axially and rotationally within the bores while maintaining an intermediate vacuum. As the seals are further compressed such movement is no longer possible, but a more compelte vacuum can be maintained.

The preferred embodiment further includes a ball member fixed to the mounting members and received in a socket member having a spherical surface with an aperture therethrough. An annular channel in the spherical surface receives a third elastic O-ring which provides the seal between the ball member and the socket member. A compression member or cap threaded to the socket member and a second annular element between the ball and the cap are used to apply pressure to the third O-ring. With the cap partially tightened, pivotal movement is still possible while maintaining a seal for an intermediate vacuum. When the cap is tightened to further compress the O-ring a better vacuum seal is possible but movement is not.

The preferred embodiment of inventive apparatus permits the borescope to be properly focused on the object under conditions of partial vacuum. When the borescope is located as desired relative to the object, its position can be fixed by further tightening of the compression members. A more complete vacuum is then possible.

DETAILED DESCRIPTION

Figure 1:
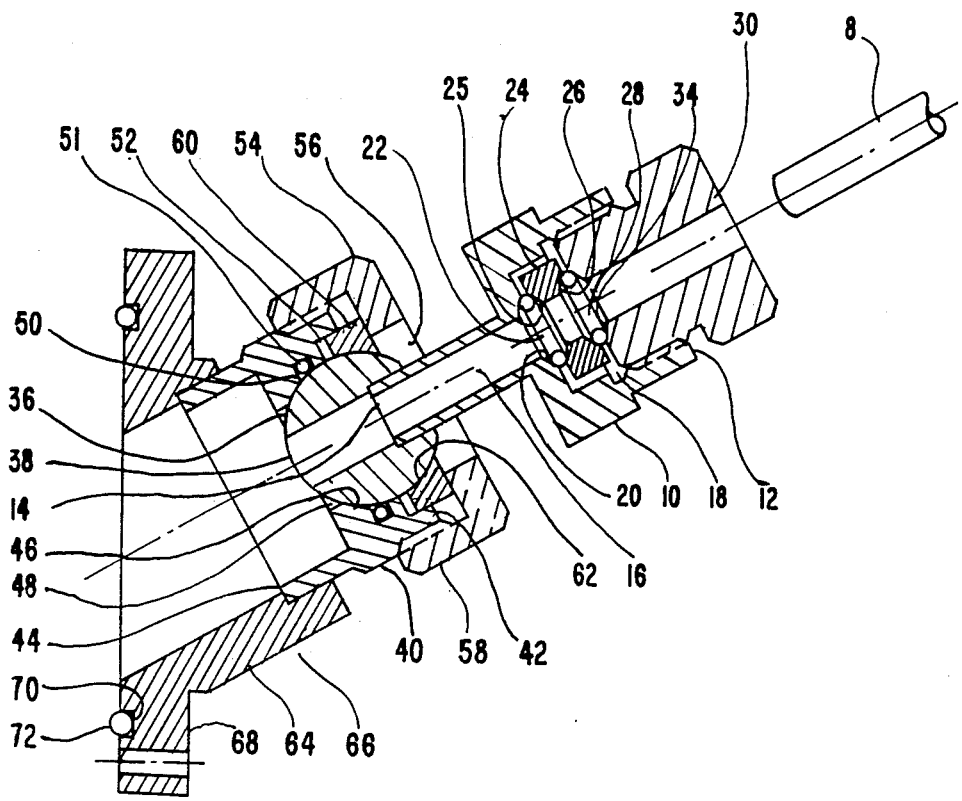
FIG. 1 is a cross sectional view of the apparatus.

Referring to FIG. 1, the apparatus includes a mounting member 10 having a first end 12, a second end 14, and bore 16 defining an axis extending therebetween. The bore 16 is sized to closely receive a cylindrical shaft 8 therethrough, the apparatus being designed four use solely with a shaft of a given diameter. The member 10 has a counterbore 18 and a first annular surface 20 which is contiguous with the bore 16. The surface 20 is bevelled at 60 degrees relative tp the axis of the bore, that is, diametrically opposed portions of the surface 20 form an angle of 120 degrees with each other. A first elestic O-ring 22 of substantially the same inner diameter as the bore 16 is received against first annular surface 20, which serves as a seat. A first annular element 24 having opposed second and third annular surfaces 25, 26 is received in counterbore 18 with the second annular surface facing the first annular surface 20 to capture the O-ring 22 therebetween. Both surfaces 25, 26 also form angles of 60 degrees with the axis, and 60 degrees with each other. A second elastic O-ring 28 identical to the first O-ring 22 is received against third annular surface 26. The counterbore 18 is internally threaded to engage a first compression member 30 having a bore 32 coaxial with bore 16 and likewise sized to closely receive the shaft 8. A fourth annular surface 34 bevelled at 60 degrees to the axis faces the third annular surface 26 and captures the second O-ring 27 therebetween.

After the shaft 8 is received through bores 32 and 16, the compression member is turned manually to apply axial pressure on the O-ring 22, 28. This in turn causes the O-rings to be radially compressed between the bevelled annular surfaces and the shaft, thus engaging the shaft 8 and sealing the first environment from the second enivronment. The annular element 24 floats in the counterbore 18 so that the pressure distribution is uniform. The 60 angle of the bevelled surface 20, 25, 26, 34 has been determined to be ideal in combination with the O-rings used to provide a good seal between a first environment at atmospheric pressure and a second environment at $10^{-9}$ Torr. The seals are type 60 of Buna-N rubber, 60 durometer, and are commonly available.

The foregoing description relates to a sealing arrangement originally disclosed in Application Ser. No.

046,599, wherein the embodiments permitted only axial and twisting movement of the shaft 8. The present embodiment is further concerned with pivotal movement and so incorporates a sealed ball and socket arrangement.

A ball member 36 is fexed to second end 14 of mounting member 10 by brazing, so that sealing at this interface is of no further concern. The member 36 has a bore 38 coaxial with bores 16, 32 but of slightly larger diameter, adequate lateral stability for the shaft 8 being provided by bores 16 and 32. The ball member 36 is received in a socket member 40 having a first end 42 toward the first environment, a second end 44 toward the second environment, and a spherical surface 46 facing the first end 42. An aperture 48 communicating between the spherical surface 48 and the second end 44 is sufficiently large to accommodate the shaft 8 as it is pivoted about the center of the ball member 36. The spherical surface 46 is interrupted by an annular channel 50 which receives a third elastic O-ring 51. The O-ring 51 stands proud of the spherical surface so that the ball member 36 is received against the O-ring 51. The socket member 40 is further provided with a counterbore 52 which closely receives a second annular element 60 having a spherical surface 62 which faces shperical surface 46 to capture the ball member 36 therebetween. The socket member 40 is externally thereaded to engage a second compression member or cap 54 having an aperture to permit pivotal movement of the shaft 8. Tightening cap 54 compresses the third O-ring 51 to provide a seal between the first and second environments.

To facilitate mounting the apparatus to a vacuum chamber or other enclosure for the second environment, the socket member 40 is brazed in cylindrical portion 66 of mounting plate 64. Flange 68 has a circular channel 70 which receives a fourth O-ring 72 which is compressed to form a seal when the plate is mounted to the enclosure by bolts or the like. Alternatively, since movement at this interface is not a consideration, sealing may be provided by other known means such as a copper gasket which is compressed between two surfaces with ridges.

It use, shaft 8 is inserted through the apparatus prior to applying any pressure to O-rings 22, 28 and 51. The first and second compression members 30, 54 may then be drawn up to a limited extent to provide sealing for a limited pressure differential while still permitting axial, rotational, and pivotal movement of the shaft. This allows the end of shaft 8 to be located at any point in a three dimensional space in a chamber under partial vacuum, which for the embodiment shown is a pressure of about $10^{-7}$ Torr. Subsequent to locating the shaft as desired, the compression members 30, 54 are tightened further to achieve a seal which is effective against a greater pressure differential, which in the embodiment shown is the difference between atmospheric pressure and about $10^{-9}$ Torr in the vacuum chamber. Note that the O-ring seals not only provide an environmental seal but further provide gripping between the surfaces which capture them. Thus, the O-rings 22, 28 not only serve a sealing function, but grip the shaft 8 to prevent its being drawn into a high vacuum second environment. In this regard it will be noted that most of the sealing of the shaft is provided by O-ring 22, while both rings 22 and 28 grip the shaft 8 to fix it relative to mounting member 10.

The foregoing is exemplary and not intended to limit the scope of the claims which follow. For example, while the inventive apparatus was originally directed to sealing means for the shaft of a borescope, it is equally useful for sealing other members of circular cross section passing between first and second environments. In this respect, a tube, a pipe and other cylindrically profiled members should be considered the equivalents of a shaft.

What is claimed:

1. Apparatus for receiving a shaft extending from a first environment to a second environment and sealing said environments from each other, said apparatus comprising a mounting memeber having a first end toward said first environment, a second end toward said second environment, and bore means defining an axis therebetween for closely receiving said shaft therethrough, said member further having a first annular surface contiguous with said bore means toward said first end, a first elastic O-ring received against said first annular surface, a first annular element having opposed second and third annular surfaces, said second annular surface facing said first annular surface to capture said first O-ring therebetween, at least one of said first and second annular surfaces being bevelled relative to said axis, a second elastic O-ring received against said third annular surface, a first compression member threadably engaging said first end of said mounting member and having coaxial bore means and a contiguous fourth annular surface facing said third annular surface to capture said second O-ring therebetween, at least one of said third and fourth annular surfaces being bevelled relative to said axis, said compression means having axial bore means therethrough, whereby, upon feeeding said shaft through said bore means of said mounting member, said bore means of said compression means, and said O-rings therebetween, and upon therading said compression member toward said mounting member, said O-rings will be radially compressed between said bevelled surfaces and said shaft to engage said shaft and seal said first environment from said second environment.

2. Apparatus as in claim 1 wherein said first and second annular surfaces are both bevelled realtive to said aixs.

3. Apparatus as in claim 2 wherein said first and second annular surfaces each form an angle of about 60 degrees with said axis.

4. Apparatus as in claim 1 wherein said third and fourth annular surfaces are both bevelled relative to said axis.

5. Apparatus as in claim 1 wherein said third and fourth annular surfaces each form an angle of about 60 degrees with said axis.

6. Apparatus as in claim 1 wherein mounting member further comprises a counterbore at said first end, said O-rings and said washer-like annular element being received in said counterbore.

7. Apparatus as in claim 6 wherein said counterbore is internally threaded to engage said compression means.

8. Apparatus as in claim 1 wherein said bore means through said mounting member is sized to closely receive said shaft.

9. Apparatus as in claim 1 wherein said bore means through said mounting member is sized to closely receive said shaft.

10. Apparatus as in claim 1 further comprising a socket member having a first end toward said first environment, a second end toward said second environment, a spherical surface facing said first end, aperture means communicating between said spherical surface and said second end, and an annular channel in said spherical surface between said aperture means and said first end, a third elastic O-ring received in said annular channel, said O-ring standing proud of said spherical surface, a ball member fixed to said second end of said mounting member and having bore means therethrough coaxial with said bore means of said mounting member, said ball member being received against said third O-ring, a second compression member threadably engaging said fist end of said socket member to urge said ball member toward said spherical surface, whereby upon threading said second compression member toward said socket member, said third O-ring will be radially compressed to seal said first environment from said second environment.

11. Apparatus as in claim 10 further comprising a second annular element between said second compression member and said socket member, said second annular element having a spherical surface facing aid shperical surface of said socket member to capture said ball member therebetween.

12. Apparatus as in claim 11 wherein said socket member comprises a counterbore at said first end, said second annular element being received in said counterbore.

13. Apparatus as in claim 10 wherein said socket member is externally threaded at said first end to engage said compression member.

14. Apparatus for receiving a shaft extending from a first environment to a second environment and sealing said environments from each other, said apparatus comprising a socket member having a first end toward said first environment, a second end toward said second environment, a spherical surface opening toward said first end, aperture means communicating between said spherical surface and said second end, and an annular channel in said spherical surface between said aperture means and said first end, and elastic O-ring received in said annular channel, said O-ring standing proud of said spherical surface, a mounting member having a first end toward said first environment, a second end toward said second environment, and bore means defining an axis therebetween for receiving said shaft therethrough, sealing means at said first end of said mounting member for engaging said shaft to seal it between said first environment and said second environment, a ball member fixed to said second end of said mounting member and having bore means therethrough coaxial with said bore means of said mounting member, said ball member being received against said O-ring, a compression member threadably engaging said first end of said socket member to urge said ball member toward said shperical surface, whereby, upon threading said compression member toward said socket member, said third O-ring will be radially compressed to seal said first environment from said second environment.

15. Apparatus as in claim 14 further comprising an annular element between said compression member and said socket member, said element having a spherical surface facing said spherical surface of said socket member to capture said ball member therebetween.

16. Apparatus as in claim 15 wherein said socket member comprises a counterbore at said first end, said annular element being received in said counterbore.

17. Apparatus as in claim 14 wherein said socket member is externally threaded at said first end to engage said compression member.

* * * * *